United States Patent
Chen

(10) Patent No.: US 8,078,422 B2
(45) Date of Patent: Dec. 13, 2011

(54) SYSTEM AND METHOD FOR TESTING FREQUENCY RANGE

(75) Inventor: Cheng-Chi Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 313 days.

(21) Appl. No.: 12/512,048

(22) Filed: Jul. 30, 2009

(65) Prior Publication Data

US 2011/0004433 A1 Jan. 6, 2011

(30) Foreign Application Priority Data

Jul. 6, 2009 (CN) .......................... 2009 1 0304055

(51) Int. Cl.
*G01R 31/00* (2006.01)
*G01R 31/14* (2006.01)
*G01P 21/00* (2006.01)

(52) U.S. Cl. ...................................... 702/117; 702/108

(58) Field of Classification Search .................. 702/108, 702/117
See application file for complete search history.

(56) References Cited

U.S. PATENT DOCUMENTS

| 6,154,715 | A * | 11/2000 | Dinteman et al. ............ 702/120 |
| 6,329,642 | B1 * | 12/2001 | Kaneko et al. ................ 219/497 |
| 6,658,362 | B1 * | 12/2003 | Holden et al. ................ 702/108 |
| 6,937,965 | B1 * | 8/2005 | Bilak et al. ........................ 703/2 |
| 2008/0077348 | A1 * | 3/2008 | Hildebrand et al. .......... 702/117 |
| 2008/0086656 | A1 * | 4/2008 | Chuang ........................ 713/600 |

* cited by examiner

*Primary Examiner* — Michael Nghiem
(74) *Attorney, Agent, or Firm* — Altis Law Group, Inc.

(57) ABSTRACT

A system is used to test whether a device works normally in a preset frequency range. The system presets a frequency range, and controls a frequency generator to send a test frequency signal to the device according to each of a predetermined number of frequencies of the frequency range, and tests whether the device and electronic parts of the device can work normally to obtain test results.

10 Claims, 3 Drawing Sheets

SYSTEM AND METHOD FOR TESTING FREQUENCY RANGE

BACKGROUND

1. Technical Field

The present disclosure relates to test systems and methods, and particularly to a system and a method for testing whether a device can work normally in a preset frequency range.

2. Description of Related Art

Generally, users may want to test whether an electronic device, e.g., a central processing unit (CPU) can work normally in a preset frequency range. However, due to different electronic device configurations, as well as environmental conditions, many different frequency ranges need to be tested. Furthermore, tests for frequency ranges of electronic devices are usually done manually, thereby making the tests inefficient and inaccurate.

DETAILED DESCRIPTION

Figure 1:
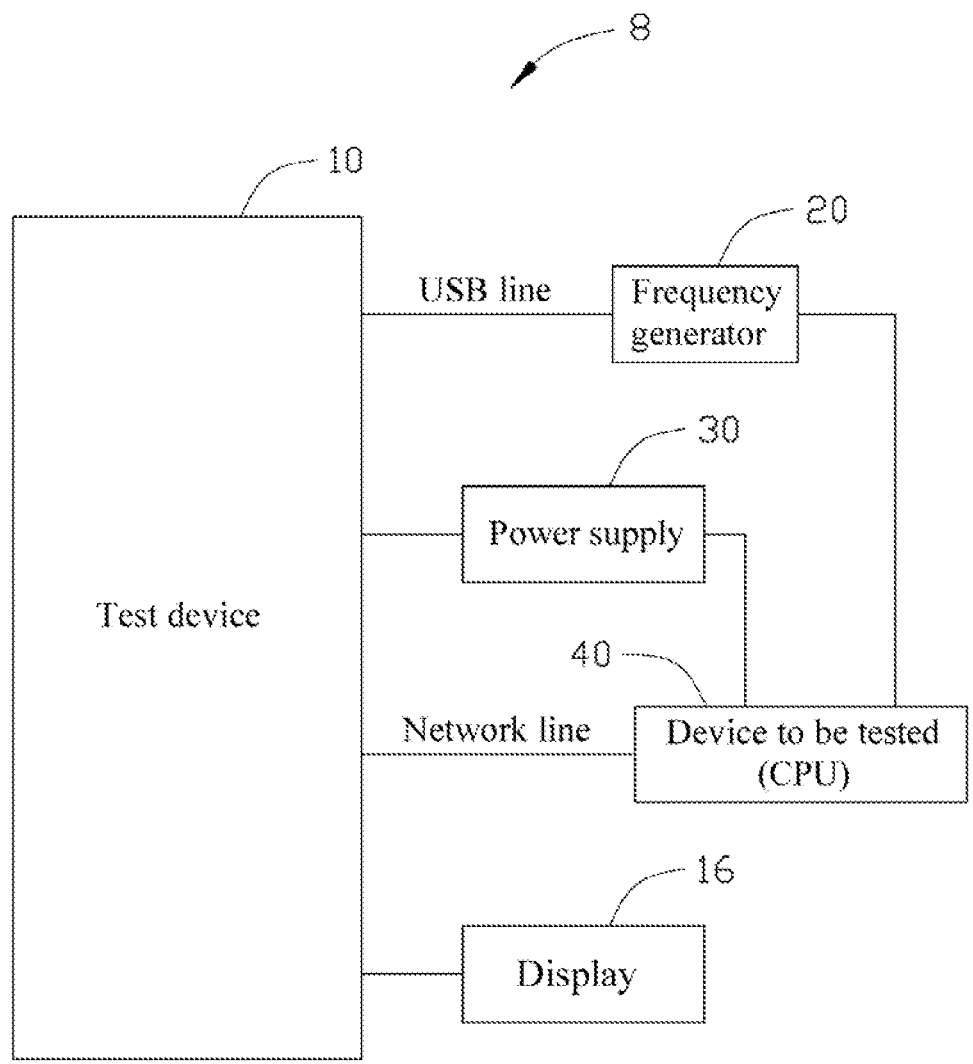
FIG. 1 is a block diagram of an exemplary embodiment of a system for testing a frequency range, the system including a test device.

Referring to FIG. 1, an exemplary embodiment of a system 8 is used to test whether a device 40 can work normally in a preset frequency range. The system 8 includes a test device 10, a display 16, a frequency generator 20, and a power supply 30. In one embodiment, the test device 10 can be a computer or another kind of electronic device, and the device 40 to be tested can be a motherboard.

The test device 10 is connected to the frequency generator 20 via a (universal serial bus) USB line, connected to the device 40 to be tested via a network line, and also connected to the display 16 and the power supply 30. The frequency generator 20 and the power supply 30 are also connected to the device 40 to be tested. In other embodiments, the test device 10 is not limited to being connected to the frequency generator 20 via the USB line, and not limited to being connected to the device 40 via the network line.

The test device 10 is to preset a frequency range, and control the frequency generator 20 to send a test frequency signal to the device 40 according to each of a predetermined number of frequencies of the frequency range, and test whether the device 40 can work normally.

Figure 2:
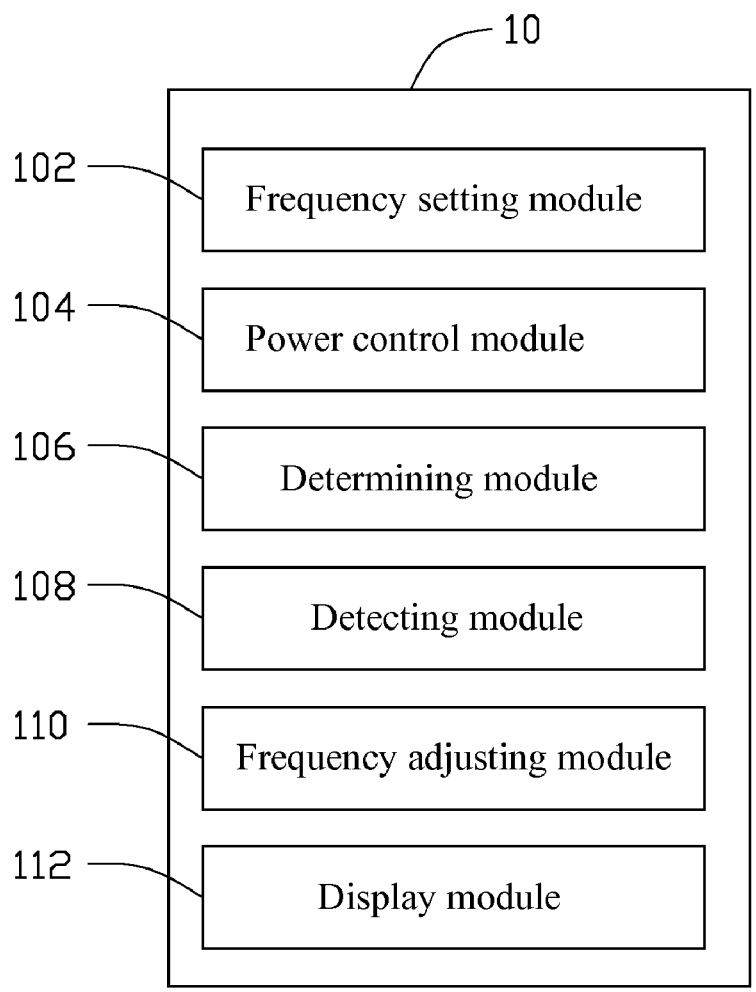
FIG. 2 is a block diagram of the test device of FIG. 1.

Referring to FIG. 2, the test device 10 includes a frequency setting module 102, a power control module 104, a determining module 106, a detecting module 108, a frequency adjusting module 110, and a display module 112.

The frequency setting module 102 is to preset the frequency range, such as [1 GHz, 10 GHz], and provide an initial test frequency, such as a minimum frequency of the frequency range, to the frequency generator 20 to make the frequency generator 20 output a test frequency signal to the device 40 to be tested. In this embodiment, the initial frequency is the minimum frequency of the frequency range.

The power control module 104 is to control the power supply 30 to provide power to the device 40 to be tested.

The determining module 106 is to determine whether the device 40 to be tested can normally boot up at the test frequency signal. After the device 40 to be tested is powered on and boots up, the device 40 will send a response signal to the determining module 106 of the test device 10. For example, the determining module 106 is set to a time period (e.g., two seconds), and starts to time, and the determining module 106 receiving the response signal from the device 40 in the time period indicates that the device 40 can normally boot up at the test frequency signal.

The detecting module 108 is to determine whether electronic parts, such as a CPU of the device 40 can work normally at the test frequency after the device 40 boots up. The detecting module 108 sends a test instruction to the device 40 to test whether an electronic part of the device 40 can work normally. In one embodiment, when the CPU of the device 40 is being tested, the test instruction may include a default algorithm executed by the CPU. The default algorithm may be a simple math formula, such as "6950+5233*7892=". The CPU finishes executing the default algorithm and gives the correct result if the CPU is working normally. If the CPU cannot execute the default algorithm or gives the wrong result, the CPU is not working normally. After finishing testing all the electronic parts of the device 40, the device 40 stores test results for the detecting module 108. In one embodiment, the test results may include "10 GHz: pass" or "15 GHz: fail." "10 GHz: pass" means that the device 40 can boot up and work normally when the test frequency is 10 GHz. "15 GHz: fail" means that the device 40 cannot boot up or work normally when the test frequency is 15 GHz. The detecting module 108 sends a shutoff signal to the power control module 104 to power off the device 40 in response to the test results indicating all the electronic parts pass. The power control module 104 controls the power supply 30 to be shut off in response to the test results indicating one of the electronic parts cannot work normally.

The frequency adjusting module 110 is to determine whether the test frequency is beyond the frequency range. For example, if the initial frequency is the minimum frequency of the frequency range, the test frequency being greater than a maximum frequency of the frequency range indicates that the test frequency is beyond the frequency range. If the test frequency is not beyond the frequency range, the frequency adjusting module 110 adds a preset constant (such as 100 MHz) to the current test frequency to obtain a new test frequency, and sends the new test frequency to the frequency generator 20 to do a next test. If the test frequency is greater than or equal to the maximum frequency of the frequency range, the frequency adjusting module 110 controls the display module 112 to show test results on the display 16. In other embodiments, if the initial test frequency is the maximum frequency of the frequency range, the frequency adjusting module 110 determines whether the test frequency is less than or equal to the minimum frequency of the frequency range. If the test frequency is greater than the minimum frequency of the frequency range, the frequency adjusting module 110 subtracts the current test frequency from a preset increment (such as 100 MHz) to obtain a new test frequency, and sends the new test frequency to the frequency generator 20.

Figure 3:
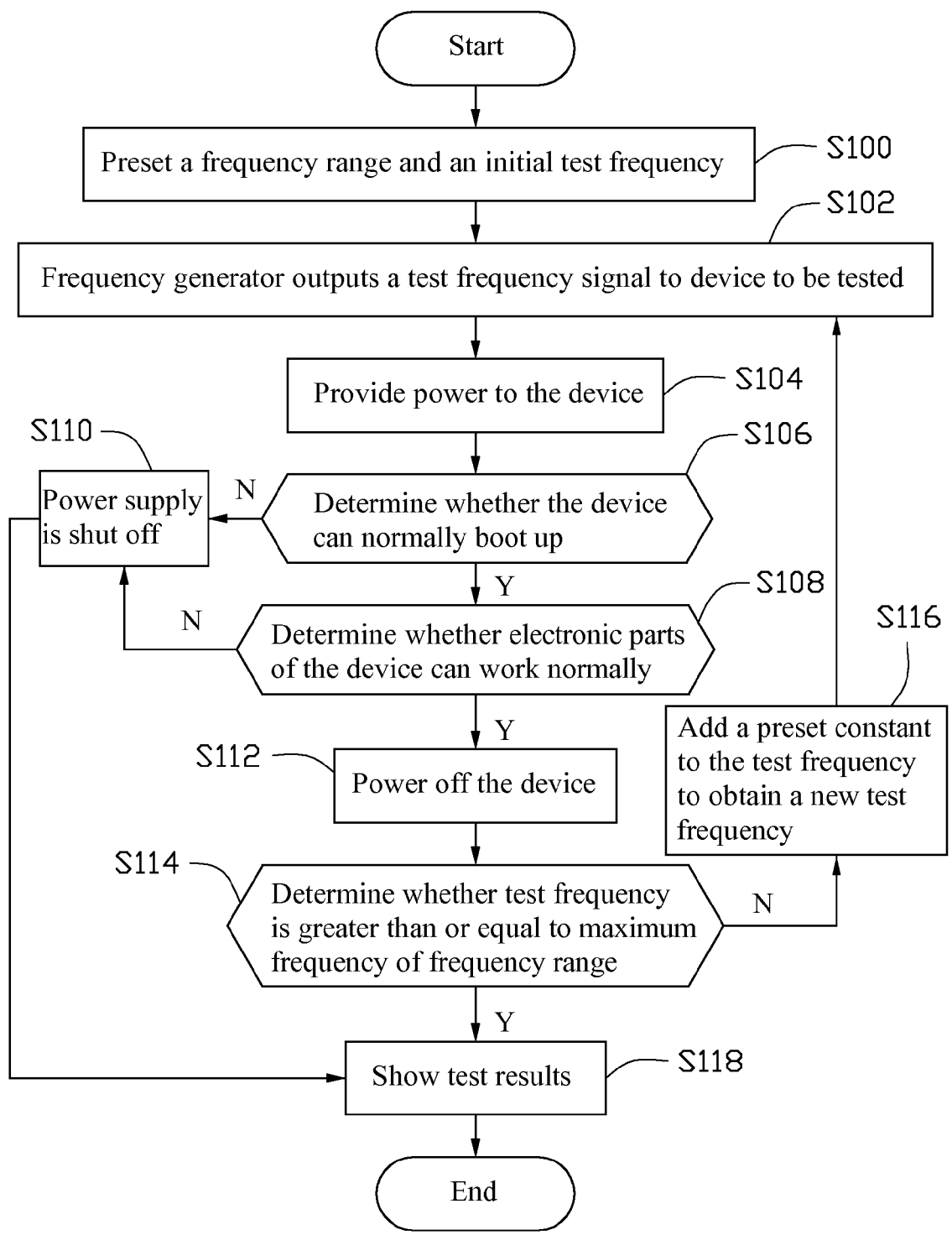
FIG. 3 is a flowchart of an exemplary embodiment of a method for testing a frequency range.

FIG. 3 is an exemplary embodiment of a method applied in the above mentioned system 8. The method includes the following steps.

In step S100, the frequency setting module 102 presets a frequency range, such as [2 GHz, 20 GHz], provides an initial test frequency, such as the minimum frequency (2 GHz) of the frequency range, to the frequency generator 20, and the procedure goes to step S102.

In step S102, the frequency generator 20 outputs a test frequency signal to the device 40 to be tested according to the test frequency.

In step S104, the power control module 104 controls the power supply 30 to provide power to the device 40.

In step S106, the determining module 106 determines whether the device 40 can normally boot up at the test frequency signal. The determining module 106 sets a time period (e.g., two seconds), and starts to time. The determining module 106 receiving a response signal from the device 40 in the time period indicates that the device 40 can normally boot up at the test frequency signal, and the procedure goes to step S108. If the determining module 106 does not receive the response signal from the device 40 in the time period, the device 40 cannot normally boot up at the test frequency signal, the procedure goes to step S110.

In step S108, the detecting module 108 determines whether electronic parts, such as a CPU of the device 40 can work normally at the test frequency. The detecting module 108 sends a test instruction to the device 40 to test whether an electronic part of the device 40 can work normally. When the CPU of the device 40 is to be tested, the test instruction may include a default algorithm, such as a simple mathematics formula "569*896−23+5986=" executed by the CPU. The CPU finishing executing the default algorithm and giving the correct result, indicates that the CPU can work normally, and the procedure goes to step S112. If the CPU cannot execute the default algorithm or gives the wrong result, the CPU cannot work normally, and the procedure goes to step S110. After finishing testing all the electronic parts of the device 40, the detection module 108 gets test results from the device 40. The test results may include "10 GHz: pass", "15 GHz: fail" or other formats. "10 GHz: pass" means that the device 40 can boot up and work normally when the test frequency is 10 GHz. "15 GHz: fail" means that the device 40 cannot boot up or work when the test frequency is 15 GHz.

In step S110, the power control module 104 controls the power supply 30 to shut off, and the procedure goes to step S118.

In step S112, the detection module 108 sends a shutoff signal to the power control module 104 to power off the device 40, and the procedure goes to step S114.

In step S114, the frequency adjusting module 110 determines whether the test frequency is greater than or equal to the maximum frequency (e.g., 20 GHz) of the frequency range. If the test frequency is greater than or equal to the maximum frequency (20 GHz) of the frequency range, the procedure goes to step S118. If the test frequency is less than the maximum frequency (20 GHz) of the frequency range, the procedure goes to step S116.

In step S116, the frequency adjusting module 110 adds a preset constant (such as 100 MHz) to the current test frequency to obtain a new test frequency, and the procedure returns to step S102.

In step S118, the frequency adjusting module 110 controls the display module 112 to show the test results on the display 16, such as "10 GHz: pass" or "15 GHz: fail", and the procedure ends.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A system for testing whether a device can work normally in a preset frequency range, the system comprising:
   a frequency generator; and
   a test device comprising:
      a frequency setting module to preset a frequency range, and provide an initial test frequency of the frequency range to the frequency generator to make the frequency generator output a test frequency signal to the device;
      a power control module to control a power supply to provide power to the device;
      a determining module to determine whether the determining module receives a response signal from the device in a time period, and whether the device can normally boot up at the test frequency signal in response to the determining module receiving the response signal from the device in a time period;
      a detecting module to determine whether electronic parts of the device can work normally at the test frequency after the device boots up, wherein the detecting module sends a test instruction to the device to test whether a corresponding one of the electronic parts of the device can work normally, after finishing testing the corresponding electronic part of the device, the detection module gets test results, the detection module sends a shutoff signal to the power control module to power off the device in response to the test results indicating all the electronic parts can work normally; and
      a frequency adjusting module to determine whether the test frequency is beyond the frequency range, add a preset constant to the current test frequency to obtain a new test frequency, and send the new test frequency to the frequency generator to do a next test in response to the test frequency being not beyond the frequency range.

2. The system of claim 1, wherein the power control module controls the power supply to shut off in response to one of the electronic parts not working normally.

3. The system of claim 1, wherein the test device further comprises a display module to show the test results.

4. The system of claim 1, wherein the initial test frequency is a minimum frequency of the frequency range, the frequency adjusting module is to determine whether the test frequency is greater than a maximum frequency of the frequency range, the frequency adjusting module adds the preset constant to the current test frequency to obtain the new test frequency, and sends the new test frequency to the frequency generator to do the next test in response to the test frequency being less than the maximum frequency of the frequency range.

5. The system of claim 1, wherein the test device is connected to the frequency generator via a universal serial bus (USB) line, and connected to the device via a network line.

6. A method for testing whether a device can work normally in a preset frequency range, the method comprising:
   presetting a frequency range, and providing an initial test frequency of the frequency range to a frequency generator;
   outputting a test frequency signal to the device;
   controlling a power supply to provide power to the device;
   determining whether a test device connected to the device receives a response signal from the device, wherein when the device cannot boot up at the test frequency signal in response to the test device not receiving the response signal, controlling the power supply to power off the device;

determining whether electronic parts of the device can work normally at the test frequency after the device boots up, sending a test instruction to the device to test whether a corresponding one of the electronic parts of the device can work normally, getting test results after finishing testing all the electronic parts of the device, and sending a shutoff signal to power off the device in response to the test results indicating all the electronic parts can work normally; and determining whether the test frequency is beyond the frequency range, adding a preset constant to the current test frequency to obtain a new test frequency, sending the new test frequency to the frequency generator to do a next test in response to the test frequency being not beyond the frequency range, and returning to the step of outputting a test frequency signal to the device.

7. The method of claim 6, further comprising:
controlling the power supply to shut off in response to one of the electronic parts cannot work normally.

8. The method of claim 6, further comprising:
controlling a display to show test results in response to the test frequency being beyond the frequency range.

9. The method of claim 6, further comprising:
finishing executing a default algorithm and receiving a correct result indicating that the corresponding electronic part can work normally, a result indicating that the corresponding electronic part is incapable of executing the default algorithm, or a wrong result indicating that the corresponding electronic part cannot work normally.

10. The method of claim 6, further comprising:
setting the initial test frequency being a minimum frequency of the frequency range and each test frequency being less than a maximum frequency of the frequency range.

* * * * *